(12) United States Patent
Frey et al.

(10) Patent No.: US 12,129,438 B2
(45) Date of Patent: Oct. 29, 2024

(54) PROCESS FOR PRODUCING JET FUEL FROM ISOMERIZING A BIORENEWABLE FEED

(71) Applicant: UOP LLC, Des Plaines, IL (US)

(72) Inventors: Stanley Joseph Frey, Palatine, IL (US); Haiyan Wang, Hoffman Estates, IL (US); Andrea G. Bozzano, Northbrook, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 17/985,604

(22) Filed: Nov. 11, 2022

(65) Prior Publication Data
US 2023/0193143 A1    Jun. 22, 2023

Related U.S. Application Data

(60) Provisional application No. 63/292,992, filed on Dec. 22, 2021.

(51) Int. Cl.
*C10G 45/64*   (2006.01)
*B01J 21/04*   (2006.01)
(Continued)

(52) U.S. Cl.
CPC .............. *C10G 45/64* (2013.01); *B01J 21/04* (2013.01); *B01J 23/30* (2013.01); *B01J 23/888* (2013.01);
(Continued)

(58) Field of Classification Search
CPC . C10G 45/64; C10G 3/42; C10G 3/50; C10G 7/00; C10G 47/34; C10G 69/04;
(Continued)

(56) References Cited

U.S. PATENT DOCUMENTS 4,440,871 A * 4/1984 Lok ........................... C07C 5/41
                                                                208/136
8,058,492 B2   11/2011 Anumakonda et al.
(Continued)

FOREIGN PATENT DOCUMENTS

WO    2010000934 A1    1/2010
WO    2020083989 A1    4/2020

OTHER PUBLICATIONS

Search Report and Written Opinion for PCT/US2022/081942 dated May 4, 2023.

*Primary Examiner* — Prem C Singh
*Assistant Examiner* — Francis C Campanell
(74) *Attorney, Agent, or Firm* — Paschall & Associates, LLC; James C. Paschall

(57) ABSTRACT

A new catalyst hydroisomerizes C18 paraffins from fatty acids to a high degree to produce a composition with acceptable freeze point which retains 18 carbon atoms in the hydrocarbon molecule for jet fuel. We have discovered a fuel composition comprising at least 14 wt % hydrocarbon molecules having at least 18 carbon atoms and a freeze point not higher than −40° C. The composition also may exhibit a exhibiting a final boiling point of no more than 300° C. The hydroisomerization process can be once through or a portion of the product diesel stream may be selectively hydrocracked or recycled to hydroisomerization to obtain a fuel composition that meets jet fuel specifications.

12 Claims, 6 Drawing Sheets

(51) Int. Cl.

| | |
|---|---|
| *B01J 23/30* | (2006.01) |
| *B01J 23/888* | (2006.01) |
| *B01J 29/85* | (2006.01) |
| *B01J 37/00* | (2006.01) |
| *B01J 37/02* | (2006.01) |
| *C10G 3/00* | (2006.01) |
| *C10G 7/00* | (2006.01) |
| *C10G 47/34* | (2006.01) |
| *C10G 69/04* | (2006.01) |
| *C10L 1/08* | (2006.01) |

(52) U.S. Cl.
CPC ........... *B01J 29/85* (2013.01); *B01J 37/0009* (2013.01); *B01J 37/0201* (2013.01); *C10G 3/42* (2013.01); *C10G 3/50* (2013.01); *C10G 7/00* (2013.01); *C10G 47/34* (2013.01); *C10G 69/04* (2013.01); *C10L 1/08* (2013.01); *B01J 2229/18* (2013.01); *C10G 2300/1011* (2013.01); *C10G 2300/301* (2013.01); *C10G 2300/304* (2013.01); *C10G 2300/308* (2013.01); *C10G 2300/4081* (2013.01); *C10G 2300/70* (2013.01); *C10G 2400/08* (2013.01); *C10L 2200/0469* (2013.01); *C10L 2290/10* (2013.01); *C10L 2290/543* (2013.01)

(58) Field of Classification Search
CPC ...... C10G 2300/1011; C10G 2300/301; C10G 2300/304; C10G 2300/308; C10G 2300/4081; C10G 2300/70; C10G 2400/08; C10G 3/46; B01J 29/85; B01J 37/0009; B01J 37/0201; B01J 2229/18; B01J 2229/42; C10L 1/08; C10L 2200/0469; C10L 2290/10; C10L 2290/543; Y02P 30/20
USPC .......................................................... 585/240
See application file for complete search history.

(56) References Cited

U.S. PATENT DOCUMENTS

| | | | |
|---|---|---|---|
| 2009/0186754 A1* | 7/2009 | Elia | B01J 29/7492 502/64 |
| 2016/0289135 A1* | 10/2016 | Fichtl | C07C 5/277 |
| 2022/0411702 A1 | 12/2022 | Sarjovaara et al. | |

* cited by examiner

PROCESS FOR PRODUCING JET FUEL FROM ISOMERIZING A BIORENEWABLE FEED

CROSS-REFERENCE TO RELATED APPLICATIONS

This application claims priority from U.S. Provisional Application No. 63/292,992, filed Dec. 22, 2021, which is incorporated herein in its entirety.

FIELD

The field is producing hydrocarbons useful as aviation fuel from biorenewable feedstock such as triglycerides and free fatty acids found in materials such as plant and animal fats and oils.

BACKGROUND

As the demand for fuel increases worldwide, there is increasing interest in producing fuels and blending components from sources other than crude oil. Often referred to as a biorenewable source, these sources include, but are not limited to, plant oils such as corn, rapeseed, canola, soybean, microbial oils such as algal oils, animal fats such as inedible tallow, fish oils and various waste streams such as yellow and brown greases and sewage sludge. A common feature of these sources is that they are composed of glycerides and free fatty acids (FFA). Both triglycerides and the FFAs contain aliphatic carbon chains having from about 8 to about 24 carbon atoms. The aliphatic carbon chains in triglycerides or FFAs can be fully saturated, or mono, di or poly-unsaturated.

Hydroprocessing can include processes which convert hydrocarbons in the presence of hydroprocessing catalyst and hydrogen to more valuable products. Hydrotreating is a process in which hydrogen is contacted with hydrocarbons in the presence of hydrotreating catalysts which are primarily active for the removal of heteroatoms, such as sulfur, nitrogen, oxygen and metals from the hydrocarbon feedstock. In hydrotreating, hydrocarbons with double and triple bonds such as olefins may be saturated.

The production of hydrocarbon products in the diesel boiling range can be achieved by hydrotreating a biorenewable feedstock. A biorenewable feedstock can be hydroprocessed by hydrotreating to deoxygenate, decarboxylate and/or decarbonylate the oxygenated hydrocarbons. Decarboxylation and decarbonylation remove a carbon from the paraffin molecule; whereas, deoxygenation does not. Hydrotreating may be followed by hydroisomerization to improve cold flow properties of product diesel and jet fuel. Hydroisomerization or hydrodewaxing is a hydroprocessing process that increases the alkyl branching on a hydrocarbon backbone in the presence of hydrogen and hydroisomerization catalyst to improve cold flow properties of the hydrocarbon. Hydroisomerization includes hydrodewaxing herein.

Hydrocracking is a hydroprocessing process in which hydrocarbons crack in the presence of hydrogen and hydrocracking catalyst to lower molecular weight hydrocarbons. Depending on the desired output, a hydrocracking unit may contain one or more beds of the same or different catalyst.

When producing jet fuel from triglycerides (also referred to as "fats") a certain degree of hydrocracking and isomerization is needed to meet the specifications of jet fuel as outlined in ASTM D7566 Annex 2 and ASTM D1655. These key specifications that are required of the jet fuel in D7566 are freeze point of not higher than −40° C. (ASTM D5972, D7153 or D7154), density of no more than 772 kg/m³ (ASTM D1298 or D4052), T10 of less than 205° C. (ASTM D86), and a final boiling point (FBP) of less than 300° C. (ASTM D86). Larger molecules that do not meet these jet fuel specifications are hydrocracked primarily to meet these specifications which inherently results in low yield in the production process and in a low energy-density fuel which is undesirable. Aviation fuel is valued for its high energy per volume.

It would be desirable to provide a renewable fuel from a process that meets these three key specifications of freeze point, final boiling point and density that has higher yield from triglycerides and generates a higher energy density jet fuel. Moreover, as specifications evolve it is projected that even higher densities may be approved as higher density leads to more energy density in fuels. Therefore, a fuel that matches the other performance specifications of the ASTM D7566 Annex 2 but with a density higher than 772 kg/m³ would be highly beneficial in future scenarios.

SUMMARY OF THE INVENTION

By hydroisomerizing C18 paraffins from fatty acids to a high degree due to a new hydroisomerization catalyst we have produced a composition with acceptable freeze point which retains 18 carbon atoms in the hydrocarbon molecule for jet fuel. We have discovered a fuel composition comprising at least 14 wt % hydrocarbon molecules having at least 18 carbon atoms and a freeze point not higher than −40° C. The composition also may exhibit a final boiling point of no more than 300° C. The hydroisomerization process can be once through or a portion of the product diesel stream may be selectively hydrocracked or recycled to hydroisomerization to obtain a fuel composition that meets jet fuel specifications.

DEFINITIONS

Figure 1:
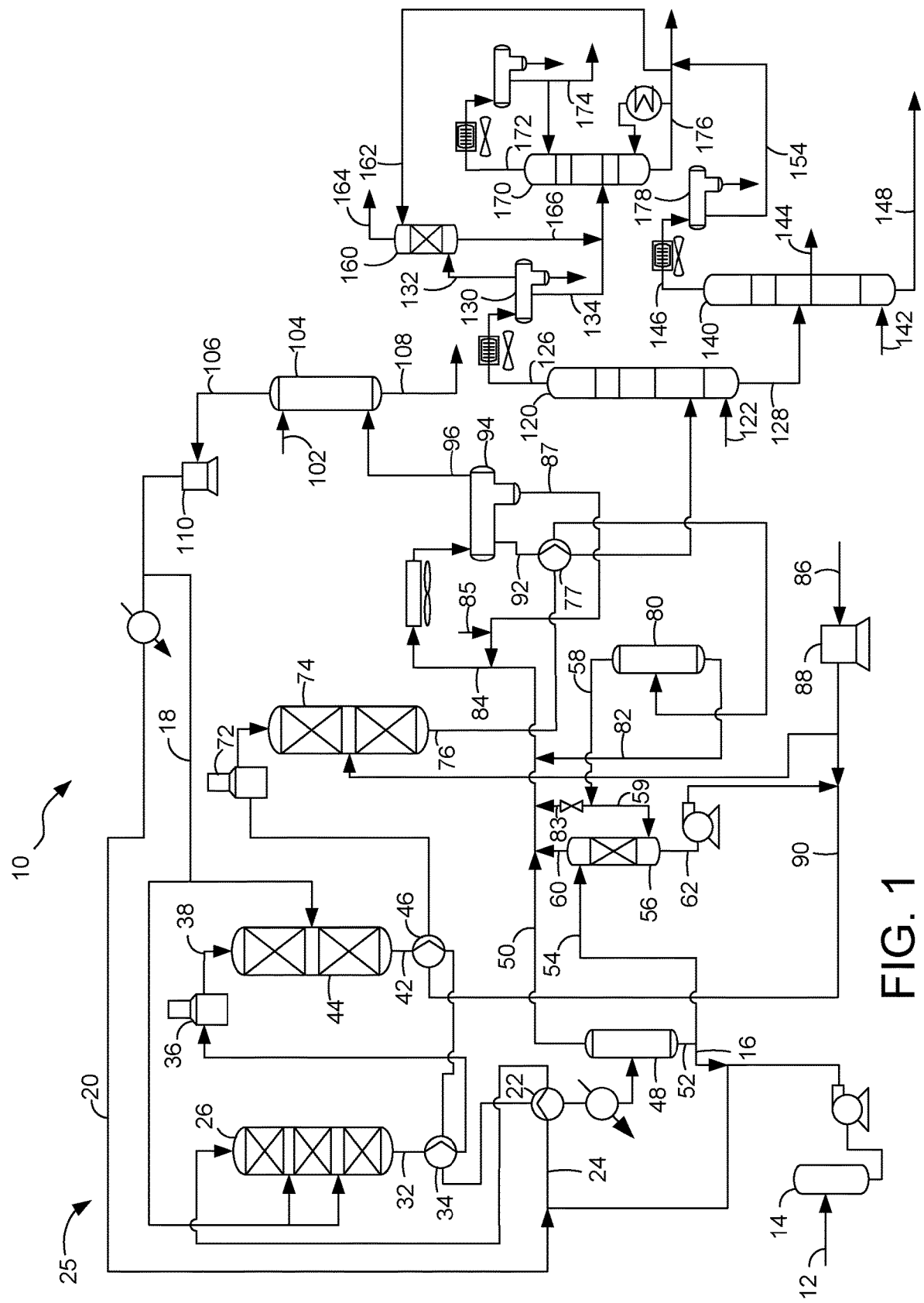
FIG. 1 is a schematic process flow diagram of the present disclosure.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through a fractionation or conversion unit to undergo a compositional change due to physical fractionation or chemical conversion.

The term "indirect communication" means that flow from the upstream component enters the downstream component after passing through a fractionation or conversion unit to undergo a compositional change due to physical fractionation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns may omit a reboiler at a bottom of the column and instead provide heating requirements and separation impetus from a fluidized inert media such as steam. Stripping columns typically feed a top tray and take main product from the bottom.

As used herein, the term "a component-rich stream" means that the rich stream coming out of a vessel has a greater concentration of the component than the feed to the vessel.

As used herein, the term "a component-lean stream" means that the lean stream coming out of a vessel has a smaller concentration of the component than the feed to the vessel.

As used herein, the term "boiling point temperature" means atmospheric equivalent boiling point (AEBP) as calculated from the observed boiling temperature and the distillation pressure, as calculated using the equations furnished in ASTM D86 or ASTM D2887.

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "T5" or "T95" means the temperature at which 5 mass percent or 95 mass percent, as the case may be, respectively, of the sample boils using ASTM D-86 or TBP.

As used herein, the term "initial boiling point" (IBP) means the temperature at which the sample begins to boil using ASTM D2887, ASTM D-86 or TBP, as the case may be.

As used herein, the term "final boiling point" (FBP) means the temperature at which the sample has all boiled off using ASTM D2887, ASTM D-86 or TBP, as the case may be.

As used herein, the term "diesel boiling range" means hydrocarbons boiling in the range of an IBP between about 125° C. (257° F.) and about 175° C. (347° F.) or a T5 between about 150° C. (302° F.) and about 200° C. (392° F.) and the "diesel cut point" comprising a T95 between about 343° C. (650° F.) and about 399° C. (750° F.) using the TBP distillation method.

As used herein, the term "diesel conversion" means conversion of feed that boils above the diesel cut point to material that boils at or below the diesel cut point in the diesel boiling range.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

As used herein, the term "$C_x$" are to be understood to refer to molecules having the number of carbon atoms represented by the subscript "x". Similarly, the term "$C_x-$" refers to molecules that contain less than or equal to x and preferably x and less carbon atoms. The term "$C_x+$" refers to molecules with more than or equal to x and preferably x and more carbon atoms.

As used herein, the term "carbon number" refers to the number of carbon atoms per hydrocarbon molecule and typically a paraffin molecule.

DETAILED DESCRIPTION

In the production of jet fuel from trigylcerides, the first step is to hydrodeoxygenate the biorenewable feed. The hydroprocessed products are normal C18 paraffins in predominance and normal C16 paraffins. The normal C18 paraffin does not meet the ASTM D7566 jet fuel specification. Normal C18 boils at 317° C., so it is in excess of the 300° C., FBP specification, has a density of 777 kg/m³ in excess of the 772 kg/m³, density specification, and a melting point of 29° C. in excess of the −40° C., freeze point specification according to D7566. Additionally, the remainder of the triglycerides is typically mostly normal C16 paraffins which boil at 286° C. making even this lighter fraction too heavy to meet the ASTM D7566 requirement of a maximum T10 boiling temperature of 205° C. Conventionally, a hydrocracking step with a small degree of isomerization was necessary to move these normal C18 paraffins into the specified jet boiling, freeze point, and density ranges. Unfortunately, hydrocracking typically results in the production of a monomethyl C16− paraffins. By this process, the freeze point specification was met through isomerization and hydrocracking, the FBP specification by hydrocracking, the T10 specification by hydrocracking, and the density specification by hydrocracking. The resulting jet fuel product yield as well as the jet fuel product energy density was greatly reduced due to the pervasive hydrocracking.

We propose to increase the hydroisomerization and reduce the hydrocracking of the hydroprocessed products to preserve the concentration of C18 paraffin in the product which will maintain energy density while decreasing the concentration of normal C18 paraffins and converting them into iso-C18 paraffins. The selectivity of the conversion process is changed from hydrocracking to hydroisomerization by use of a hydroisomerization catalyst that may be based on SAPO-11 rather than a high acid cracking catalyst such as one comprising amorphous silica-alumina. Fractionation may be performed to produce a jet fuel product stream that meets ASTM D7566 jet fuel specifications. The jet fuel yield may be greater than 70 wt % and preferably greater than 80 wt % of the paraffinic feed to the hydroisomerization reactor.

In FIG. 1, in accordance with an exemplary embodiment, a process 10 is shown for processing a biorenewable feedstock. A feed line 12 transports a feed stream of fresh biorenewable feedstock into a feed surge drum 14. The biorenewable feedstock may be blended with a mineral feed stream but preferably comprises a predominance of biorenewable feedstock. A mineral feedstock is a conventional feed derived from crude oil that is extracted from the ground. The biorenewable feedstock may comprise a nitrogen concentration of about 50 wppm to about 800 wppm. The biorenewable feedstock may comprise high oxygen content which can be up to 10 wt % or higher. The biorenewable feedstock may also comprise about 1 to about 500 wppm sulfur, typically no more than about 200 wppm sulfur.

A variety of different biorenewable feedstocks may be suitable for the process 10. The term "biorenewable feedstock" is meant to include feedstocks other than those obtained from crude oil. The biorenewable feedstock may include any of those feedstocks which comprise at least one of glycerides and free fatty acids. Most of glycerides will be triglycerides, but monoglycerides and diglycerides may be present and processed as well. Free fatty acids may be obtained from phospholipids which may source phosphorous in the feedstock. Examples of these biorenewable feedstocks include, but are not limited to, camelina oil, canola oil, corn oil, soy oil, rapeseed oil, soybean oil, colza oil, tall oil, sunflower oil, hempseed oil, olive oil, linseed oil, coconut oil, babassu oil, castor oil, peanut oil, palm oil, mustard oil, tallow, yellow and brown greases, lard, train oil, fats in milk, fish oil, algal oil, sewage sludge, and the like. Additional examples of biorenewable feedstocks include non-edible vegetable oils from the group comprising *Jatropha curcas* (Ratanjot, Wild Castor, Jangli Erandi), *Madhuca indica* (Mohuwa), *Pongamia pinnata* (Karanji, Honge), *Calophyllum inophyllum, Moringa oleifera* and *Azadirachta indica* (Neem). The triglycerides and FFAs of the typical vegetable or animal fat contain aliphatic hydrocarbon chains in their structure which have about 8 to about 30 carbon atoms. As will be appreciated, the biorenewable feedstock may comprise a mixture of one or more of the foregoing examples. The biorenewable feedstock may be pretreated to remove contaminants and filtered to remove solids.

The biorenewable feed stream in feed line 12 flows from the feed surge drum 14 via a charge pump and mixes with a hot recycle stream in a recycle line 16 and a recycle hydrotreating hydrogen stream in a hydrotreating hydrogen line 20 to provide a combined biorenewable feed stream. The recycle to feed rate can be about 2:1 to about 5:1. The combined biorenewable feed stream 12 may be heated in a combined feed exchanger 22 by heat exchange with a hydrotreated stream in a hydrotreated line 42. The heated combined biorenewable feed stream in a combined feed line 24 may be then charged to a hydrotreating reactor section 25.

The hydrotreating reactor section 25 may include a guard bed reactor 26. The guard bed reaction temperature may range between about 246° C. (475° F.) and about 343° C. (650° F.) and suitably between about 288° C. (550° F.) and about 304° C. (580° F.). Reaction temperature is operated low enough to prevent olefins in the FFA from polymerizing but high enough to foster olefin saturation, hydrodemetallation, hydrodeoxygenation, hydrodesulfurization and hydrodenitrification reactions to occur. Hydrodeoxygenation reactions preferably minimize hydrodecarbonylation and hydrodecarboxylation reactions to preserve carbon atoms on the paraffin chain.

The guard bed can comprise a base metal on a support. Base metals useable in this process include non-noble metals, nickel, chromium, molybdenum and tungsten. Other base metals that can be used include tin, indium, germanium, lead, cobalt, gallium and zinc. The process can also use a metal sulfide, wherein the metal in the metal sulfide is selected from one or more of the base metals listed. The biorenewable feedstock can be charged through the base metal catalysts at pressures from 1379 kPa (abs) (200 psia) to 13790 kPa (abs) (2000 psia). In a further embodiment, the guard bed catalyst can comprise a second metal, wherein the second metal includes one or more of the metals: tin, indium, ruthenium, rhodium, rhenium, osmium, iridium, germanium, lead, cobalt, gallium, zinc and thallium. A nickel molybdenum on alumina catalyst may be a suitable catalyst in the guard bed reactor 26. Multiple guard beds may be contained in the guard bed reactor 26 such as 2, 3 or more and a hydrogen quench from a hydrogen quench line 18 may be injected at interbed locations to control temperature exotherms.

A contacted biorenewable feed stream is discharged from the guard bed reactor 26 in contacted feed line 32. In the guard bed reactor 26, most of the hydrodemetallation and hydrodeoxygenation reactions will occur with some hydrodenitrogenation and hydrodesulfurization occurring. Metals removed will include alkali metals and alkali earth metals and phosphorous.

The contacted biorenewable feed stream may be heated in a guard bed discharge heat exchanger 34 by heat exchange with a hydrotreated stream in the hydrotreated line 42 to increase the temperature of the contacted biorenewable feed stream. Moreover, the contacted biorenewable feed stream may be further heated in a charge heater 36 which may be a fired heater to increase the temperature of the contacted biorenewable feed stream. The hydrotreating reactor section 25 may also include a hydrotreating reactor 44. The heated, contacted biorenewable feed stream is charged to a hydrotreating reactor 44 of the hydrotreating reactor section 25.

In the hydrotreating reactor 44, the heated, contacted biorenewable feed stream is contacted with a hydrotreating catalyst in the presence of hydrogen at hydrotreating conditions to saturate the olefinic or unsaturated portions of the n-paraffinic chains in the biorenewable feedstock. The hydrotreating catalyst also catalyzes hydrodeoxygenation reactions, including hydrodecarboxylation and hydrodecarbonylation reactions, to remove oxygenate functional groups from the hydrocarbon molecules in the biorenewable feedstock which are converted to water and carbon oxides. The hydrotreating catalyst also catalyzes hydrodesulfurization of organic sulfur and hydrodenitrogenation of organic nitrogen in the biorenewable feedstock. Essentially, the hydrotreating reaction removes heteroatoms from the hydrocarbons and saturates olefins in the feed stream.

The hydrotreating catalyst may be provided in one, two or more beds and employ interbed hydrogen quench streams from the hydrogen quench stream from a hydrogen quench line 18. Two hydrotreating catalyst beds are shown in FIG. 1, but one or more are contemplated.

The hydrotreating catalyst may comprise nickel, nickel/molybdenum, or cobalt/molybdenum dispersed on a high surface area support such as alumina. Other catalysts include one or more noble metals dispersed on a high surface area support. Non-limiting examples of noble metals include platinum and/or palladium dispersed on an alumina support such as gamma-alumina. Suitable hydrotreating catalysts include BDO 200 or BDO 300 or BDO 400 available from UOP LLC in Des Plaines, Illinois. The hydrotreating reaction temperature may range from between about 271° C. (520° F.) and about 427° C. (800° F.) and preferably between about 304° C. (580° F.) and about 400° C. (752° F.). Generally, hydrotreating conditions include a pressure of about 700 kPa (100 psig) to about 21 MPa (3000 psig).

A hydrotreated stream is produced in a hydrotreated line 42 from the hydrotreating reactor 44 of the hydrotreating reactor section 25 comprising a hydrocarbon fraction which has a substantial n-paraffin concentration. Oxygenate concentration in the hydrocarbon fraction is essentially nil, whereas the olefin concentration is substantially reduced relative to the contacted biorenewable feed stream. The organic sulfur concentration in the hydrocarbon fraction is no more than 500 wppm and the organic nitrogen concentration in the hydrocarbon fraction is less than 10 wppm.

The hydrotreated stream in the hydrotreated line 42 may first flow to the combined isomerization feed exchanger 46 to heat the hydoisomerization feed stream in the hydroisomerization feed line 90 and cool the hydrotreated stream. As previously described, the cooled hydrotreated stream in the hydrotreated line 42 may then be heat exchanged with the contacted biorenewable feed stream in the guard bed discharge heat exchanger 34 to cool the hydrotreated stream in the hydrotreated line 42 and heat the contacted, biorenewable feed stream in contacted line 32. The twice cooled hydrotreated steam in the hydrotreated line 42 may be then further cooled in the combined feed exchanger 22 by heat exchange with combined biorenewable feed stream in the combined feed line 24 to heat the combined biorenewable feed stream and cool the hydrotreated stream in the hydrotreated line 42. The thrice cooled hydrotreated stream may be even further cooled, perhaps to make steam, before it is separated to provide a hydrotreated vapor stream and a hydrotreated liquid stream having a smaller oxygen concentration than the biorenewable feed stream.

The hydrotreated stream may be separated in a hot separator 48 to provide a hydrocarbonaceous, hot vapor stream in a hot separator overhead line 50 and a hydrocarbonaceous, hot liquid stream in a hot separator bottoms line 52. The hot separator 48 may be in downstream communication with the hydrotreating reactor 44. The hot separator 48 operates at about 177° C. (350° F.) to about 371° C. (700° F.) and preferably operates at about 232° C. (450° F.) to about 315° C. (600° F.). The hot separator 34 may be operated at a slightly lower pressure than the hydrotreating reactor 44 accounting for pressure drop through intervening equipment. The hot separator 48 may be operated at pressures between about 3.4 MPa (gauge) (493 psig) and about 20.4 MPa (gauge) (2959 psig). The hot vapor stream in the hot separator overhead line 50 may have a temperature of the operating temperature of the hot separator 48.

The hot liquid stream in the hot separator bottoms line 52 may be split into two streams: a hot process liquid stream in a process line 54 taken from the hot liquid stream in the hot separator bottoms line 52 and the hot recycle liquid stream in the recycle line 16 also taken from the hot liquid stream in the hot separator bottoms line 52. The hot recycle liquid stream in the recycle line 16 may be combined with the biorenewable feed stream in line 12 as previously described.

The hot process liquid stream taken from the hot liquid stream in the process line 54 may be further separated in a hydrotreating separator 56 which may comprise an enhanced hot separator (EHS) with the aid of a stripping gas fed in a stripping line 59 taken from an isomerization overhead line 58. The hot process liquid stream is separated to provide a hydrotreated vapor stream in a hydrotreated overhead line 60 and a hydrotreated liquid stream in a hydrotreated bottoms line 62. The hydrotreating separator 56 may be a high-pressure stripping column. In the hydrotreating separator 56, the hot process liquid stream from process line 54 flows down through the column where it is partially stripped of hydrogen, carbon dioxide, carbon monoxide, water vapor, propane, hydrogen sulfide, and phosphine, which are potential isomerization catalyst poisons, by contact with stripping gas from the stripping line 59. The stripping gas may comprise makeup hydrogen gas which has passed through the isomerization reactor 74 and an isomerization separator 80 as hereinafter described.

The stripping gas in the stripping line 59 enters the hydrotreating separator 56 below the inlet for the hot process liquid stream in the process liquid line 54. The hydrotreating separator 56 may include internals such as trays or packing located between the inlet for the hot process liquid stream in the process liquid line 54 and the inlet for the stripping gas in the stripping line 59 to facilitate stripping of the hot process liquid stream in the process line 54. The stripping gas including stripped gases exit in a hydrotreated vapor stream in the hydrotreated overhead line 60 extending from a top of the hydrotreating separator 56 and mix with the hot vapor stream in the hot overhead line 50, an optional bypass stream in a bypass line 83, an isomerization liquid stream in an isomerization bottoms line 82, and optionally a cold aqueous stream in a cold aqueous line 87 from a cold separator boot.

The hydrotreated liquid stream which may have been stripped collects in the bottom of the hydrotreating separator 56 and flows in a hydrotreated bottoms line 62 to the suction side of a bottoms pump. The hydrotreated liquid stream comprises diesel range material, with a high paraffinic concentration due to the composition of the biorenewable feedstock.

While a desired product, such as a transportation fuel, may be provided in the hydrotreated bottoms line 62 because the hot liquid stream comprises a higher concentration of normal paraffins, particularly normal C18 paraffins, it will possess poor cold flow properties and high FBP disqualifying it from meeting jet fuel specifications. Accordingly, to improve the cold flow properties and reduce FBP, the hydrotreated liquid stream may be contacted with a hydroisomerization catalyst in a hydroisomerization reactor 74 under hydroisomerization conditions to hydroisomerize the normal paraffins to branched paraffins.

The hydrotreated liquid stream may be hydroisomerized over hydroisomerization catalyst in the presence of a hydroisomerization hydrogen stream. Make-up hydrogen gas in make-up line 86 may be compressed in a make-up gas compressor 88 and mixed with the hydrotreated liquid stream pumped from the hydrotreated bottoms line 62 to provide a hydroisomerization feed stream in a hydroisomerization feed line 90. The hydroisomerization feed stream in the hydroisomerization feed line 90 may be heated in an isomerization feed exchanger 46 by heat exchange with the hydrotreated stream in the hydrotreated line 42. The hydroisomerization feed stream may be heated in a hydroisomerization charge heater 72 to bring the hydroisomerization feed stream to hydroisomerization temperature before charging the hydroisomerization feed stream to the hydroisomerization reactor 74.

Hydroisomerization, including hydrodewaxing, of the normal hydrocarbons in the hydroisomerization reactor 74 can be accomplished over one or more beds of hydroisomerization catalyst, and the hydroisomerization may be operated in a co-current mode of operation. Fixed bed, trickle bed down-flow or fixed bed liquid filled up-flow modes are both suitable. A make-up hydrogen quench stream taken from the make-up line 86 may be provided for interbed quench to the hydroisomerization reactor 74.

As in most chemical reactions, multiple parallel reactions may occur. These parallel reactions may in the case of dewaxing through hydroisomerization often be hydrocracking reactions producing naphtha range products, which represent a yield loss for the jet fuel and diesel pool, and thus an economical loss as well as a cost due to consumption cost of hydrogen. We have discovered a hydroisomerization catalyst that is highly effective in isomerizing normal C18 paraffin to iso-C18 paraffin without hydrocracking parts of the C18 molecule to smaller molecules.

The hydroisomerization catalyst comprises a dehydrogenation metal, a molecular sieve and a metal oxide binder. The hydroisomerization catalyst may comprise a dehydrogenation metal comprising a Group VIII metal. The dehydrogenation metal(s) may be selected from platinum, palladium, nickel, nickel molybdenum sulfide or nickel tungsten sulfide. Preferably, the dehydrogenation metal is selected from platinum or nickel tungsten sulfide. The concentration of dehydrogenation metal on the hydroisomerization catalyst may comprise from 0.05 to 5 wt % based on the transition metal(s).

The dehydrogenation metal is distributed between the molecular sieve and the binder with about 40 to about 65 wt %, preferably 45 to about 60 wt %, of the metals distributed on the molecular sieve and about 40 to about 65 wt %, preferably 45 to about 60 wt %, of the metals distributed on the binder. The associated benefit of the hydroisomerization catalyst is high activity and selectivity toward hydroisomerization. In a further embodiment the hydroisomerization catalyst further comprises less than about 0.5 wt % carbon with the associated benefit of high activity and selectivity towards hydroisomerization.

In an embodiment, the hydroisomerization catalyst comprises one or more molecular sieves having a topology selected from AEI, AEL, AFO, AFX, ATO, BEA, CHA, FAU, FER, MEL, MFI, MOR, MRE, MTT, MWW or TON, such as EU-2, ZSM-11, ZSM-22, ZSM-23, ZSM-48, SAPO-5, SAPO-11, SAPO-31, SAPO-34, SAPO-41, SSZ-13, SSZ-16, SSZ-39, MCM-22, zeolite Y, ferrierite, mordenite, ZSM-5 or zeolite beta, with the associated benefit of the molecular sieve being active in the hydroisomerization of linear hydrocarbons. SAPO-11 was found to be of particular utility.

The metal oxide binder may be taken from the group comprising alumina, silica, silica-alumina and titania or mixtures thereof. Preferably the metal oxide binder is alumina and preferably it is gamma alumina.

The hydroisomerization catalyst may comprise a molecular sieve having an AEL topology and more specifically it may be SAPO-11. Most of the acid sites on SAPO-11 are weak to moderate acid sites More specifically, at least 50% of the total acidity on the SAPO-11 is weak acidity and at least 60-80% of the external acidity on SAPO-11 is weak acidity.

The hydroisomerization catalyst typically comprises particles having a diameter of about 1 to about 5 millimeters. The catalyst production typically involves the formation of a stable, porous support, followed by impregnation of active metals. The stable, porous support typically comprises a metal oxide as well as a molecular sieve, which may be a zeolite. The stable support is produced with a high porosity, to ensure maximum surface area, and it is typically desired to disperse the active metal over the full internal and external surface area of the support.

DI-200 available from UOP LLC in Des Plaines, Illinois may be a suitable hydroisomerization catalyst.

Hydroisomerization conditions generally include a temperature of about 150° C. (302° F.) to about 450° C. (842° F.) and a pressure of about 1724 kPa (abs) (250 psia) to about 13.8 MPa (abs) (2000 psia). In another embodiment, the hydroisomerization conditions include a temperature of about 300° C. (572° F.) to about 388° C. (730° F.), a pressure of about 3102 kPa (abs) (450 psia) to about 13790 kPa (abs) (2000 psia) and a LHSV of about 0.5 to 3 $hr^{-1}$.

A hydroisomerized stream in a hydroisomerized line 76 from the isomerization reactor 74 is a branched-paraffin-rich stream. Preferably the hydroisomerized stream is predominantly a branched paraffin stream. It is envisioned that the hydroisomerized effluent may contain 80, 90 or 95 mass-% branched paraffins of the total paraffin content. Hydroisomerization conditions in the hydroisomerization reactor 74 are selected to avoid undesirable cracking, so the predominant product in the hydroisomerized stream in the hydroisomerized line 76 is a branched paraffin. By avoiding undesirable cracking, the hydroisomerized stream in the hydroisomerized line 76 will have near and only slightly less of the same composition with regard to carbon numbers as the hydroisomerization feed stream in the hydroisomerization feed line 90. For example, although the hydroisomerization feed stream may have 18 wt % paraffins with eighteen carbon atoms, the hydroisomerized stream will generally also have near, maybe slightly less than 18 wt % paraffins with eighteen carbon atoms. The hydroisomerized stream will have a greater proportion of paraffins that are iso-C18's than the hydroisomerization feed stream and the hydroisomerization feed stream will have a greater proportion of paraffins that are normal C18's than the hydroisomerized stream. The optimal amount of remaining normal paraffins in line 76 is dependent on the selectivity of the hydroisomerization catalysts but might typically be between 1-7 wt-%.

The hydroisomerized stream in the hydroisomerized line 76 from the isomerization reactor 74 flows to an isomerate exchanger 77 to be heat exchanged with a cold liquid stream in cold bottoms line 92 to cool it before entering the hydroisomerization separator 80 for separation into a liquid hydroisomerized stream and vapor hydroisomerized stream. The vapor hydroisomerized stream in a hydroisomerized overhead line 58 extending from an overhead of hydroisomerization separator 80 may provide the stripping gas in the stripping line 59 for the hydrotreating separator 56. A portion of the vapor hydroisomerized stream may optionally bypass the hydrotreating separator 56 in bypass line 83 and enter the cold feed line 84 through a control valve.

The liquid hydroisomerized stream in the hydroisomerization bottoms line 82 extending from a bottom of the hydroisomerization separator 80 may be sent directly to a distillation column 140 for producing product streams without condensing and cooling. However, the liquid hydroisomerized stream from the hydroisomerization separator 80 in the hydroisomerization bottoms line 82 may be further separated in a cold separator 94 along with the hot vapor stream in the hot overhead line 50, the hydrotreated vapor stream in the hydrotreated overhead line 60, the bypass stream in the bypass line 83 and the cold aqueous stream in the cold aqueous line 87 from the boot of the cold separator 94 all combined in a cold separator stream in the cold separator feed line 84. The cold aqueous stream in the cold aqueous line 87 supplemented by water from line 85 is added to the cold separator feed line 84 to dissolve salts that may be present in the hydrocarbon phases. The cold separator stream in the cold separator feed line 84 may be cooled and fed to the cold separator 94.

In the cold separator 94, vaporous components in the hydroisomerized liquid stream will separate and ascend with the hydrotreated vapor stream from hydrotreated overhead line 60 and the hot vapor stream in the hot overhead line 50 to provide a cold vapor stream in a cold overhead line 96. The cold vapor stream in the cold overhead line 96 may be passed through a trayed or packed recycle scrubbing column 104 where it is scrubbed by means of a scrubbing liquid such as an aqueous solution fed by scrubbing liquid line 102 to remove acid gases including hydrogen sulfide and carbon dioxide by extracting them into the aqueous solution. Preferred scrubbing liquids include Selexol™ available from UOP LLC in Des Plaines, Illinois and amines such as alkanolamines including diethanol amine (DEA), monoethanol amine (MEA), methyl diethanol amine (MDEA), diisopropanol amine (DIPA), and diglycol amine (DGA). Other scrubbing liquids can be used in place of or in addition to the preferred amines. The lean scrubbing liquid contacts the cold vapor stream and absorbs acid gas contaminants such as hydrogen sulfide and carbon dioxide. The resultant "sweetened" cold vapor stream is taken out from an overhead outlet of the recycle scrubber column 104 in a recycle scrubber overhead line 106, and an acid gas rich scrubbing liquid is taken out from the bottoms at a bottom outlet of the recycle scrubber column 104 in a recycle scrubber bottoms line 108. The spent scrubbing liquid from the bottoms may be regenerated and recycled back to the recycle scrubbing column 104 in the scrubbing liquid line 102.

The scrubbed hydrogen-rich stream emerges from the scrubber via the recycle scrubber overhead line 106 and may be compressed in a recycle compressor 110. The compressed hydrogen stream in the scrubber overhead line 106 supplies hydrogen to the hydrotreating hydrogen stream in the hydrotreating hydrogen line 20, the interbed quench streams through the quench line 18 for the guard bed reactor 26 and the hydrotreating reactor 44.

The recycle scrubbing column 104 may be operated with a gas inlet temperature between about 38° C. (100° F.) and about 66° C. (150° F.) and an overhead pressure of about 3 MPa (gauge) (435 psig) to about 20 MPa (gauge) (2900 psig). Suitably, the recycle scrubbing column 104 may be operated at a temperature of about 40° C. (104° F.) to about 125° C. (257° F.) and a pressure of about 1200 to about 1600 kPa. The temperature of the cold vapor stream 96 to the recycle scrubbing column 104 may be between about 20° C. (68° F.) and about 80° C. (176° F.) and the temperature of the scrubbing liquid stream in the scrubbing liquid line 102 may be between about 20° C. (68° F.) and about 70° C. (158° F.).

Liquid isomerized fuel components from the isomerized liquid stream and the hot vapor stream will exit the cold separator in the cold bottoms line 92. The cold liquid stream in cold bottoms line 92 comprises hydrocarbons useful as diesel and jet boiling range fuels as well as other hydrocarbons such as propane, naphtha and jet fuel. Accordingly, they may be fractionated in a distillation column 140. The cold aqueous stream may be collected from a boot of the cold separator in the cold aqueous line 87.

In an embodiment, the cold liquid stream may first be stripped in a stripping column 120 to remove hydrogen sulfide and other gases. The cold liquid stream in the cold bottoms line 92 may be heated by heat exchange in the isomerate exchanger 77 with a hydroisomerized stream in the hydroisomerized line 76 to heat the cold liquid stream and fed to the stripping column 120 from an inlet which may be in a bottom half of the column. A stripping media which is an inert gas such as steam from a stripping media line 122 may be used to strip light gases from the cold bottoms line 92. The stripping column 120 provides an overhead stripping stream of naphtha, LPG, hydrogen, hydrogen sulfide, steam and other gases in a stripper overhead line 126 and a stripped liquid isomerized stream in a stripped bottoms line 128. The overhead stripping stream may be condensed and separated in a stripping receiver 130. A net stripper overhead line 132 from the receiver 130 may carry a net stripper gaseous stream to a sponge absorber 160 for LPG recovery. Unstabilized liquid naphtha from the bottoms of the receiver 130 in a liquid overhead stream may be transported in a stripper receiver bottoms line 134 to a debutanizer column 170 for naphtha and LPG recovery. A sour water stream may be collected from a boot of the overhead receiver 130.

The stripping column 120 may be operated with a bottoms temperature between about 149° C. (300° F.) and about 288° C. (550° F.), preferably no more than about 260° C. (500° F.), and an overhead pressure of about 0.35 MPa (gauge) (50 psig), preferably no less than about 0.70 MPa (gauge) (100 psig), to no more than about 2.0 MPa (gauge) (290 psig). The temperature in the overhead receiver 130 ranges from about 38° C. (100° F.) to about 66° C. (150° F.) and the pressure is essentially the same as in the overhead of the stripping column 120.

The stripped liquid hydroisomerization stream in the stripper bottoms line 128 may be fed to the distillation column 140. The distillation column 140 may be reboiled by heat exchange with a suitable hot stream or in a fired heater to provide the necessary heat for the distillation. Alternately, a stripping media which is an inert gas such as steam from a stripping media line 142 may be used to heat the column. The distillation column 140 provides an overhead gaseous stream of naphtha and steam in an overhead line 146 and a distillation bottoms liquid stream in a distillation bottoms line 148. The distillation overhead stream may be fully condensed and separated from water in a distillation receiver 178. Unstabilized liquid naphtha from the bottom of the receiver 178 in a distillation overhead liquid line 154 may combined with a naphtha stream in line 176. A sour water stream may be collected from a boot of the distillation receiver 178.

A jet fuel stream may be taken from the side of the distillation column 140 in a side line 144. The jet fuel stream taken in the side line 144 may have a density of typically no less than 768 kg/m$^3$, suitably no less than 770 kg/m$^3$, preferably no less than 772 kg/m$^3$, and most preferably no less than 774 kg/m$^3$. In an aspect, the jet fuel stream may have a density of no more than 772 kg/m$^3$. The jet fuel stream taken in the side line 144 may meet both the −40° C. freeze point and preferably the −47° C. freeze point jet fuel specification. The jet fuel stream taken in the side line 144 may have a FBP of no more than 300° C. and preferably no more than 290° C. per ASTM D86. The C18 paraffins in the jet fuel stream are highly isomerized to greatly reduce the amount of nC18 paraffins in the jet fuel stream. The amount of C18 paraffins in the jet fuel stream may be greater than 14 wt %, suitably greater than 20 wt %, preferably greater than 30 wt % and more preferably greater than 40 wt %. The degree of isomerization can be characterized by the conversion of normal C18 paraffins with a pure boiling point at 317° C. to iso-C18 paraffins boiling at 311° C. The iso-C18 paraffins boiling at 311° C. is well into the range that can be recovered to make jet fuel product with an ASTM D86 FBP below 300° C. Iso-C18 paraffins with polymethyl substitutions greater result in a jet fuel that has sufficient components with FBP less than the 300° C. and freeze points not higher than −40° C. so as to meet the D7566 specification for jet fuel. Polymethyl substituted denotes more than two methyl substitutions. The presence of polymethyl C18 paraffins in the jet fuel allows for easier distillation of the C18 paraffins into the jet fuel fraction due to their lower boiling points compared to other C18 paraffins. The jet fuel stream may have a T5 of about 115° C. (239° F.) to about 130° C. (266° F.) and a T90 of about 240° C. (464° F.) to about 270° C. (518° F.). The jet fuel stream may have a cloud point of no more than −20° C.

This jet fuel product stream will likely have a viscosity in excess of the D1655 specification of 8 mm$^2$/s @ −20° C. and the D7566 specification of 12 mm$^2$/s @ −40° C. so it may have to be blended to meet the specification. This mode of operation and production of high C18 paraffin content jet fuel is particularly attractive when co-producing a diesel product to maximize the total distillate yield.

The C18 paraffin molecules are highly branched. We found that about 4 to about 25 wt % of the C18 paraffin molecules in the jet fuel stream and typically about 15 to about 20 wt % of the C18 paraffin molecules were monomethyl substituted. We found that about 7 to about 33 wt % of the C18 paraffin molecules in the jet fuel stream and typically about 20 to about 30 wt % of the C18 paraffin molecules were dimethyl substituted. We found that about 8 to about 25 wt % of the C18 paraffin molecules in the jet fuel stream and typically about 15 to about 23 wt % of the C18 paraffin molecules were polymethyl substituted.

Even though the process provides highly isomerized C18 paraffins, yield reduction was not noticed. We have recorded jet fuel yields of at least 70 and at least 80% based on the hydroisomerization feed rate.

Optionally a light diesel stream may be taken in a second side line that is not shown. The distillation bottoms liquid stream in the distillation bottoms line 148 may be a diesel stream having a T5 of about 230° C. (446° F.) to about 296° C. (590° F.) and a T90 of about 343° C. (650° F.) to about 399° C. (750° F.). Both of the side streams may be stripped in a side stripper that is not shown.

The normal C18 paraffins will concentrate in the heavier hydrocarbon stream. Distilling the jet fuel in the first side stream in the side line 144 and even light diesel in the second side stream, will heavily enrich the concentration of normal C18 paraffins in the heavy diesel stream in the distillation bottoms line 148 enabling the jet fuel stream to meet jet fuel specifications. If necessary, the heavy diesel stream in the distillation bottoms line 148 with an increased concentration of normal C18 paraffins may then be subjected to additional hydroisomerization or hydrocracking in a hydrocracking reactor by recycle to further produce jet fuel meeting specifications.

The distillation column 140 may be operated with a bottoms temperature between about 149° C. (300° F.) and about 288° C. (550° F.), preferably no more than about 260° C. (500° F.), and an overhead pressure of about 0.35 MPa (gauge) (50 psig), preferably no less than about 0.70 MPa (gauge) (100 psig), to no more than about 2.0 MPa (gauge) (290 psig). The temperature in the overhead receiver 178 ranges from about 38° C. (100° F.) to about 66° C. (150° F.) and the pressure is essentially the same as in the overhead of the distillation column 140. It is also envisioned that the distillation column 140 may just provide a net overhead stream comprising jet fuel in the distillation overhead liquid line 154, with naphtha and lighter stream taken in a receiver overhead line (not shown), and a diesel stream taken in the distillate bottoms line 148.

The sponge absorber column 160 may receive the net stripper gaseous stream in the net stripper overhead line 132. A lean absorbent stream in a lean absorbent line 162 may be fed into the sponge absorber column 160 through an absorbent inlet. The lean absorbent may comprise a naphtha stream in a lean absorbent line 162 perhaps from a debutanizer bottoms stream in line 176. In the sponge absorber column 160, the lean absorbent stream and the net stripper gaseous stream are counter-currently contacted. The sponge absorbent absorbs LPG hydrocarbons from the net stripper gaseous stream into an absorbent rich stream.

The hydrocarbons absorbed by the sponge absorbent include some methane and ethane and most of the LPG, $C_3$ and $C_4$, hydrocarbons, and any $C_5$ and $C_{6+}$ light naphtha hydrocarbons in the net stripper gaseous stream. The sponge absorber column 160 operates at a temperature of about 34° C. (93° F.) to about 60° C. (140° F.) and a pressure essentially the same as or lower than the stripping receiver 130 less frictional losses. A sponge absorption off gas stream depleted of LPG hydrocarbons is withdrawn from a top of the sponge absorber column 160 at an overhead outlet through a sponge absorber overhead line 164. The sponge absorption off gas stream in the sponge absorber overhead line 164 may be transported to a hydrogen recovery unit that is not shown for hydrogen recovery. A rich absorbent stream rich in LPG hydrocarbons is withdrawn in a rich absorber bottoms line 166 from a bottom of the sponge absorber column 160 at a bottoms outlet which may be fed to a debutanizer column 170 via the stripper liquid overhead stream in the stripper receiver bottoms line 134.

In an embodiment, the debutanizer column 170 may fractionate the stripper liquid overhead stream and the rich absorbent stream in the stripper receiver bottoms line 134 into a debutanized bottoms stream comprising predominantly $C_{5+}$ hydrocarbons and a debutanizer overhead stream comprising LPG hydrocarbons. The debutanizer overhead stream in a debutanizer overhead line 172 may be fully condensed with reflux to the debutanizer column 170 and recovery of LPG in a debutanized overhead liquid stream in a net receiver bottoms line 174. The debutanized bottoms stream may be withdrawn from a bottom of the debutanizer column 170 in a debutanized bottoms line 176. A reboil stream taken from a bottom of the debutanizer column 170 or from a debutanized bottoms stream in the debutanizer bottoms line 176 may be boiled up in the reboil line and sent back to the debutanizer column 170 to provide heat to the column. Alternatively, a hot inert media stream such as steam may be fed to the column 170 to provide heat.

The distillation bottoms stream in the distillation bottoms line 148 may comprise heavy diesel boiling range hydrocarbons. In the embodiment of FIG. 1 the jet fuel stream in the side line 144 and the diesel stream in line 148 may be taken once through, with no recycle. The cut point in the product fractionation column 120 between the diesel stream in the bottoms line 148 and the jet fuel stream in the side line 144 can be adjusted to ensure that the jet fuel stream has the appropriate composition to meet jet fuel specifications, at least after blending, particularly to meet the jet fuel density specification. However, because the normal C18 paraffins are concentrated in the diesel product stream it is well suited for hydrocracking or further hydroisomerization.

If the density or other property of the jet fuel stream is too high to meet the ASTM 7566 specification, a refiner may desire to convert some of the diesel stream into jet fuel at a reduced density to enable the jet fuel product stream to exhibit a density that meets specification.

Figure 2:
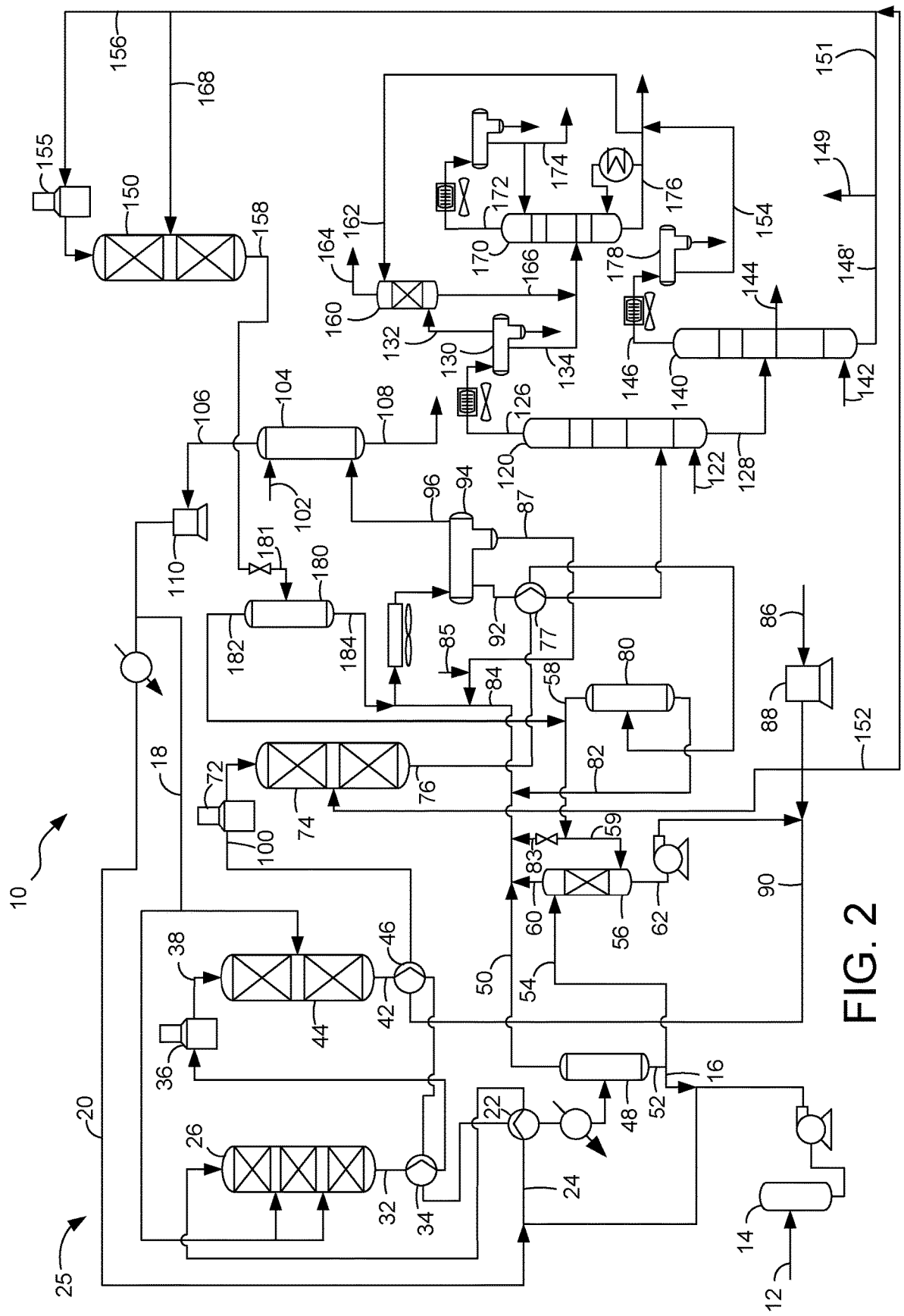
FIG. 2 is a schematic process flow diagram of an alternative embodiment of FIG. 1.

FIG. 2 shows an alternative embodiment which employs a hydrocracking reactor 150 to hydrocrack large normal hydrocarbons into the jet fuel boiling range at lower density to reduce the density of the overall jet fuel product stream. Elements in FIG. 2 with the same configuration as in FIG. 1 will have the same reference numeral as in FIG. 1. Elements in FIG. 2 which have a different configuration as the corresponding element in FIG. 1 will have the same reference numeral but designated with a prime symbol ('). The configuration and operation of the embodiment of FIG. 2 is essentially the same as in FIG. 1 with the following exceptions.

The diesel stream in the distillation bottoms line 148' may be split between a diesel product stream in line 149 and a recycle stream in line 151. The diesel product stream in line 149 may be taken to the diesel pool. The recycle stream in line 151 may be mixed with a hydrocracking hydrogen stream in line 152 taken from the compressed make-up hydrogen stream in line 86, heated in a heater 155 and fed in line 156 to a hydrocracking reactor 150.

The hydrocracking reactor 150 may be a fixed bed reactor that comprises one or more vessels, single or multiple catalyst beds in each vessel, and various combinations of hydrocracking catalyst in one or more vessels. The hydrocracking reactor 150 may be operated in a conventional continuous gas phase, a moving bed or a fluidized bed hydroprocessing reactor. It is also envisioned that the hydrocracking reactor 150 and the hydroisomerization reactor 74 could share the same vessel.

The heavy diesel stream is hydroprocessed over a hydrocracking catalyst in the hydrocracking reactor in the presence of a hydrocracking hydrogen stream from a hydrocracking hydrogen line 152 to provide a hydrocracked stream. A portion of the diesel stream in line 168 may be used as an interbed quench to cool hydrocracked effluent between catalyst beds. In an alternative aspect, the supplemental hydrogen may be added between the catalyst beds.

The hydrocracking reactor may provide a total conversion of at least about 20 vol % and typically greater than about 60 vol % of the heavy diesel stream in the distilled bottoms line 148 to products boiling below the heavy diesel range of about 293° C. (560° F.) to about 310° C. (590° F.). The hydrocracking reactor 150 may operate at partial conversion of more than about 30 vol % or full conversion of at least about 90 vol % of the feed based on total conversion. The hydrocracking reactor 40 may be operated at mild hydrocracking conditions which will provide about 20 to about 60 vol %, preferably about 20 to about 50 vol %, total conversion of the hydrocarbon feed stream to product boiling below the heavy diesel boiling range.

The hydrocracking catalyst may utilize amorphous silica-alumina bases or zeolite bases combined with one or more Group VIII or Group VIB metal hydrogenating components to selectively produce a balance of light diesel and jet fuel distillate. In another aspect, a catalyst which comprises, in general, any crystalline zeolite cracking base upon which is deposited a Group VIII metal hydrogenating component may be suitable. Additional hydrogenating components may be selected from Group VIB for incorporation with the zeolite base. Moreover, the hydroisomerization catalyst from the hydroisomerization reactor 74 can be used as hydrocracking catalyst in the hydrocracking reactor 150 but run at the high end of the hydroisomerization temperature range.

The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and about 14 Angstroms. It is preferred to employ zeolites having a relatively high silica/alumina mole ratio between about 3 and about 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8 and 12 Angstroms, wherein the silica/alumina mole ratio is about 4 to 6. One example of a zeolite falling in the preferred group is synthetic Y molecular sieve.

The natural occurring zeolites are normally found in a sodium form, an alkaline earth metal form, or mixed forms. The synthetic zeolites are nearly always prepared in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,100,006.

Mixed polyvalent metal-hydrogen zeolites may be prepared by ion-exchanging with an ammonium salt, then partially back exchanging with a polyvalent metal salt and then calcining. In some cases, as in the case of synthetic mordenite, the hydrogen forms can be prepared by direct acid treatment of the alkali metal zeolites. In one aspect, the preferred cracking bases are those which are at least about 10 wt %, and preferably at least about 20 wt %, metal-cation-deficient, based on the initial ion-exchange capacity. In another aspect, a desirable and stable class of zeolites is one wherein at least about 20 wt % of the ion exchange capacity is satisfied by hydrogen ions.

The active metals employed in the preferred hydrocracking catalysts of the present invention as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 wt % and about 30 wt % may be used. In the case of the noble metals, it is normally preferred to use about 0.05 to about 2 wt % noble metal. Noble metals may be preferred as the hydrogenation metal on the hydrocracking catalyst to provide selectivity to jet fuel due to the absence of hydrogen sulfide and ammonia which can deactivate noble metal catalysts, but which have been removed upstream in the process.

The method for incorporating the hydrogenation metal is to contact the base material with an aqueous solution of a suitable compound of the desired metal wherein the metal is present in a cationic form. Following addition of the selected hydrogenation metal or metals, the resulting catalyst powder is then filtered, dried, pelleted with added lubricants, binders or the like if desired, and calcined in air at temperatures of, e.g., about 371° C. (700° F.) to about 648° C. (200° F.) in order to activate the catalyst and decompose ammonium ions. Alternatively, the base component may be pelleted, followed by the addition of the hydrogenation component and activation by calcining.

The foregoing catalysts may be employed in undiluted form, or the powdered catalyst may be mixed and copelleted with other relatively less active catalysts, diluents or binders such as alumina, silica gel, silica-alumina cogels, activated clays and the like in proportions ranging between about 5 and about 90 wt %. These diluents may be employed as such, or they may contain a minor proportion of an added hydrogenating metal such as a Group VIB and/or Group VIII metal. Additional metal promoted hydrocracking catalysts may also be utilized in the process of the present invention which comprises, for example, aluminophosphate molecular sieves, crystalline chromosilicates and other crystalline silicates. Crystalline chromosilicates are more fully described in U.S. Pat. No. 4,363,178.

By one approach, the hydrocracking conditions may include a temperature from about 290° C. (550° F.) to about 468° C. (875° F.), preferably 300° C. (572° F.) to about 445° C. (833° F.), a pressure from about 2.7 MPa (gauge) (400 psig) to about 20.7 MPa (gauge) (3000 psig), a liquid hourly space velocity (LHSV) from about 0.4 to less than about 2.5 $hr^{-1}$ and a hydrogen rate of about 421 $Nm^3/m^3$ (2,500 scf/bbl) to about 2,527 $Nm^3/m^3$ oil (15,000 scf/bbl).

The hydrocracked stream may exit the hydrocracking reactor 150 in a hydrocracked line 158. In an embodiment, the hydrocracked stream may be separated and fed back to fractionation. The hydrocracked stream in the hydrocracked line 158 may be transported to a hydrocracking separator 180 to be separated. The hydrocracked stream may be separated in a hydrocracking separator 180 to provide a vapor hydrocracked stream in a hydrocracking separator overhead line 182 and a liquid hydrocracked stream in a hydrocracking separator bottoms line 184. The hydrocracking separator 180 may be in downstream communication with the hydrocracking reactor 150.

The hydrocracking separator 180 operates at about 177° C. (350° F.) to about 371° C. (700° F.) and preferably operates at about 232° C. (450° F.) to about 315° C. (600° F.). The hydrocracking separator 180 may be operated at a slightly lower pressure than the hydrocracking reactor 150 accounting for pressure drop through intervening equipment. The hydrocracking separator 180 may be operated at pressures between about 3.4 MPa (gauge) (493 psig) and about 20.4 MPa (gauge) (2959 psig). The vapor hydrocracked stream in the hydrocracking separator overhead line 182 may have a temperature of the operating temperature of the hydrocracking separator 180. The vapor hydrocracked stream in the hydrocracking separator overhead line 182 may be combined with stripping gas in the isomerization overhead line 58 for stripping the process stream in line 54 taken from the hot separator bottoms stream.

The hydrocracked liquid stream in a hydrocracking separator bottoms line 184 may be processed with the cold separator feed stream in line 84 to be cooled and separated in the cold separator 94 with the hot vapor stream in the hot overhead line 50, the hydrotreated vapor stream in the hydrotreated overhead line 60, the bypass stream in bypass line 83, the liquid hydroisomerized stream in the hydroisomerization bottoms line 82 and the cold aqueous stream in the cold aqueous line 87.

The jet fuel and the diesel components in the hydrocracked liquid stream in the isomerization bottoms line 92 will then be optionally stripped in the stripping column 120 and distilled in the distillation column 140 into the jet fuel stream in line 144 and the diesel stream in line 148. The jet fuel stream in the side line 144 will easily meet the jet fuel specifications, particularly with respect to density.

Figure 3:
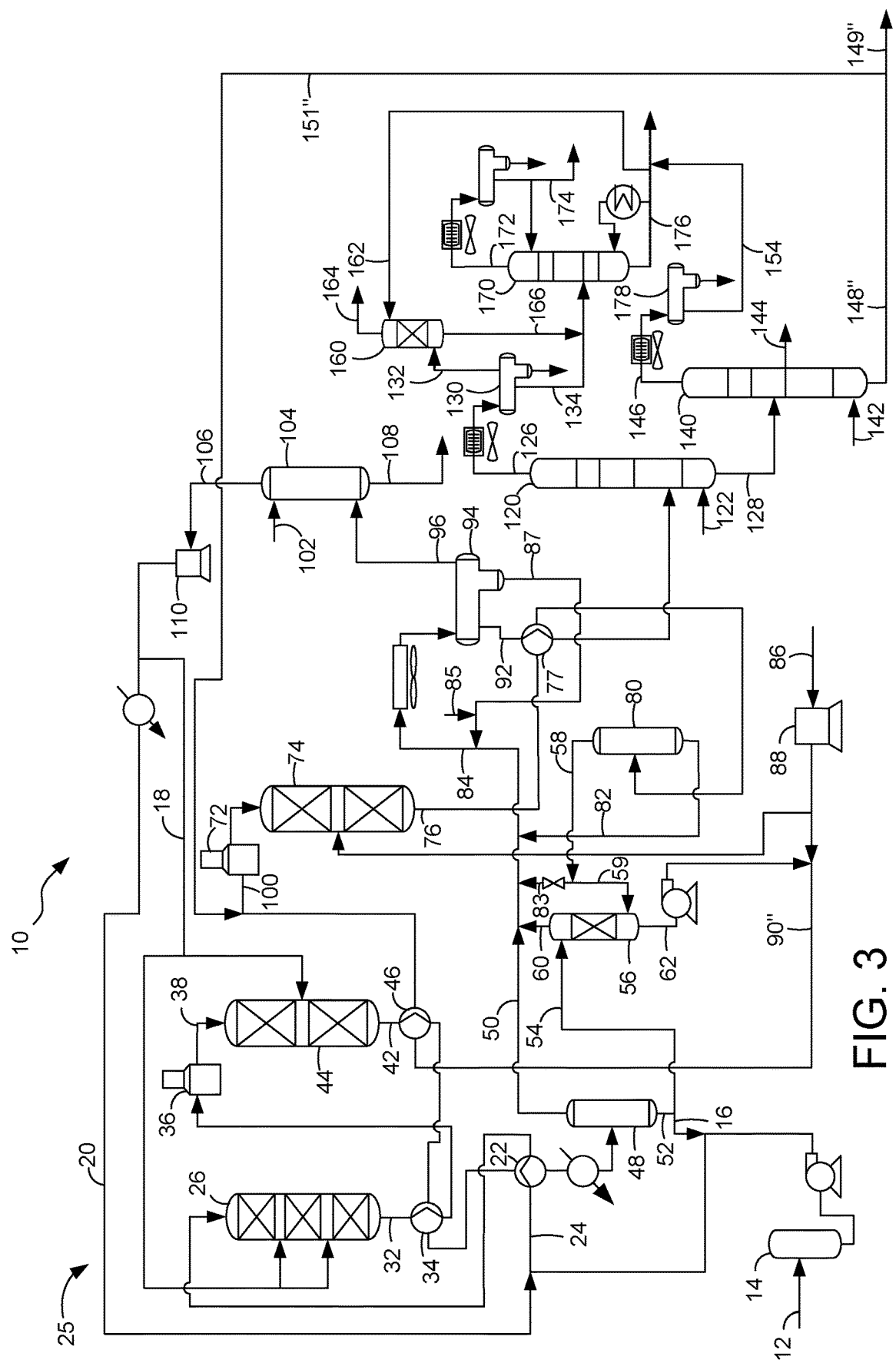
FIG. 3 is a schematic process flow diagram of a further alternative embodiment of FIG. 1.

FIG. 3 is a further alternative embodiment to FIG. 1 which recycles the diesel stream to the hydroisomerization reactor 74 to further hydroisomerize diesel range hydrocarbons which do not exhibit properties which will meet the jet fuel specification. Elements in FIG. 3 with the same configuration as in FIG. 1 will have the same reference numeral as in FIG. 1. Elements in FIG. 3 which have a different configuration as the corresponding element in FIG. 1 will have the same reference numeral but designated with a double prime symbol ("). The configuration and operation of the embodiment of FIG. 3 is essentially the same as in FIG. 1 with the following exceptions.

The diesel stream in the distilled bottoms line 148" is split between a diesel product stream in line 149" and a recycle stream in a recycle line 151". The hydroisomerization feed stream in the hydroisomerization feed line 90" may be heated in an isomerization feed exchanger 46 by heat exchange with the hydrotreated stream in the hydrotreated line 42. The heated hydroisomerization feed stream may be mixed with the recycle stream in the recycle line 151" to provide a combined hydroisomerization feed stream in a combined hydroisomerization feed line 100. The combined hydroisomerization feed stream may be heated in a hydroisomerization charge heater 72 to bring the combined hydroisomerization feed stream to hydroisomerization temperature before charging the combined hydroisomerization feed stream to the hydroisomerization reactor 74.

By hydroisomerizing the recycle diesel stream by recycling it to the hydroisomerization reactor, more of the remaining normal C18 paraffins are isomerized to iso-C18 paraffins to bring them into the jet fuel product specification and taken in the jet fuel stream 144.

EXAMPLE

Example 1

The molecular sieve SAPO-11 was extruded with Versal-251 pseudoboehmite alumina that had been peptized with 4 wt-% aqueous nitric acid. The extrudates were dried, then calcined with steam, converting the Versal-251 pseudoboehmite to gamma alumina. Conditions typical of a calcination are: 30 to 90 minutes of residence time, 1000 to 1300° F., with and without steam. The resulting calcined support was impregnated with 0.25 wt % platinum in a tetraamine platinum chloride solution, then oxidized at 700 to 900° F. for 30 to 90 minutes in a furnace/oxidizer, with and without steam. The catalyst was then reduced with flowing hydrogen for 4 to 6 hours at 650 to 700° F. at atmospheric pressure. After the dehydrogenation metal was reduced, the catalyst may process up to 100% hydrodeoxygenated renewable feedstock at the following processing condition ranges: 500 to 1400 psig, 1500 to 10000 SCFB hydrogen per feed, 550 to 750° F., 0.25 to 2.5 LHSV.

Chemical mapping of a sample of catalyst prepared as described indicated that the platinum levels on the SAPO-11 and the gamma alumina support were essentially equivalent with 0.27 wt %±0.07 wt % Pt/SAPO-11 and 0.29 wt %±0.09 wt % Pt/alumina. The chemical mapping was done by scanning transmission electron microscopy. Atom counting was accomplished by collecting a series of images at atomic resolution (5.1 Mx magnification) over sufficiently thin regions of the support. Intensity contributions from the individual atoms were counted for scanned areas of 265 $nm^2$ for each of the three samples. Topography was ignored for simplicity and thus individual atom density per square area represented the number of individual atoms per area of image as opposed to surface area of the support.

Additional characterization of the materials was made by measuring the acidity of the molecular sieve. In the tests that were performed, the SAPO-11 was tested for external acidity by testing for absorption of collidine and for total acidity by absorption of pyridine. Samples were each about 10 mg, ground to a fine powder and pressed into 13 mm diameter self-supporting pellets. Separate experiments were run for each sample for pyridine and collidine. The samples were pretreated in helium at 500° C. for 2 hours, then adsorbing pyridine or collidine at 150° C. for 1 hour and then three discrete desorptions for 1 hour each at 150° C., 300° C. and 450° C. Bronsted acid strength distribution for total acidity showed mainly weak and moderate acidity. For the external sites, for the SAPO-11 powders, the acid strength distribution skewed to mainly weak acidity followed by moderate acidity with very little strong acidity. The results of the tests with pyridine were weak 0.07, moderate 0.06, strong 0.0005 with a total of 0.14 with all measurements being in Bronsted peak area/mg. Similar results were found for acidity of external sites with the relative value of weak sites of 0.11, moderate sites of 0.03, strong sites of 0.01 and total sites of 0.15 area/mg.

Example 2

The molecular sieve SAPO-11 with the same gamma alumina support as in Example 1 was impregnated with nickel and tungsten metals at about a 3.5/18 wt % ratio. We performed the disclosed process in a pilot plant in which a hydrotreated stream proceeded through isomerization. Isomerization conditions included an average bed temperature of 337° C. (640° F.) to 343° C. (650° F.), a LHSV of 1.25 hr$^{-1}$, a hydrogen to hydrocarbon ratio of 3624 Nm$^3$/m$^3$ (1550 SCF/bbl) to 3858 Nm$^3$/m$^3$ (1650 SCF/bbl) and a pressure of about 5.6 MPa (815 psig). Normal C18 paraffins were isomerized and retained in the jet fuel product stream in high proportions.

Figure 4:
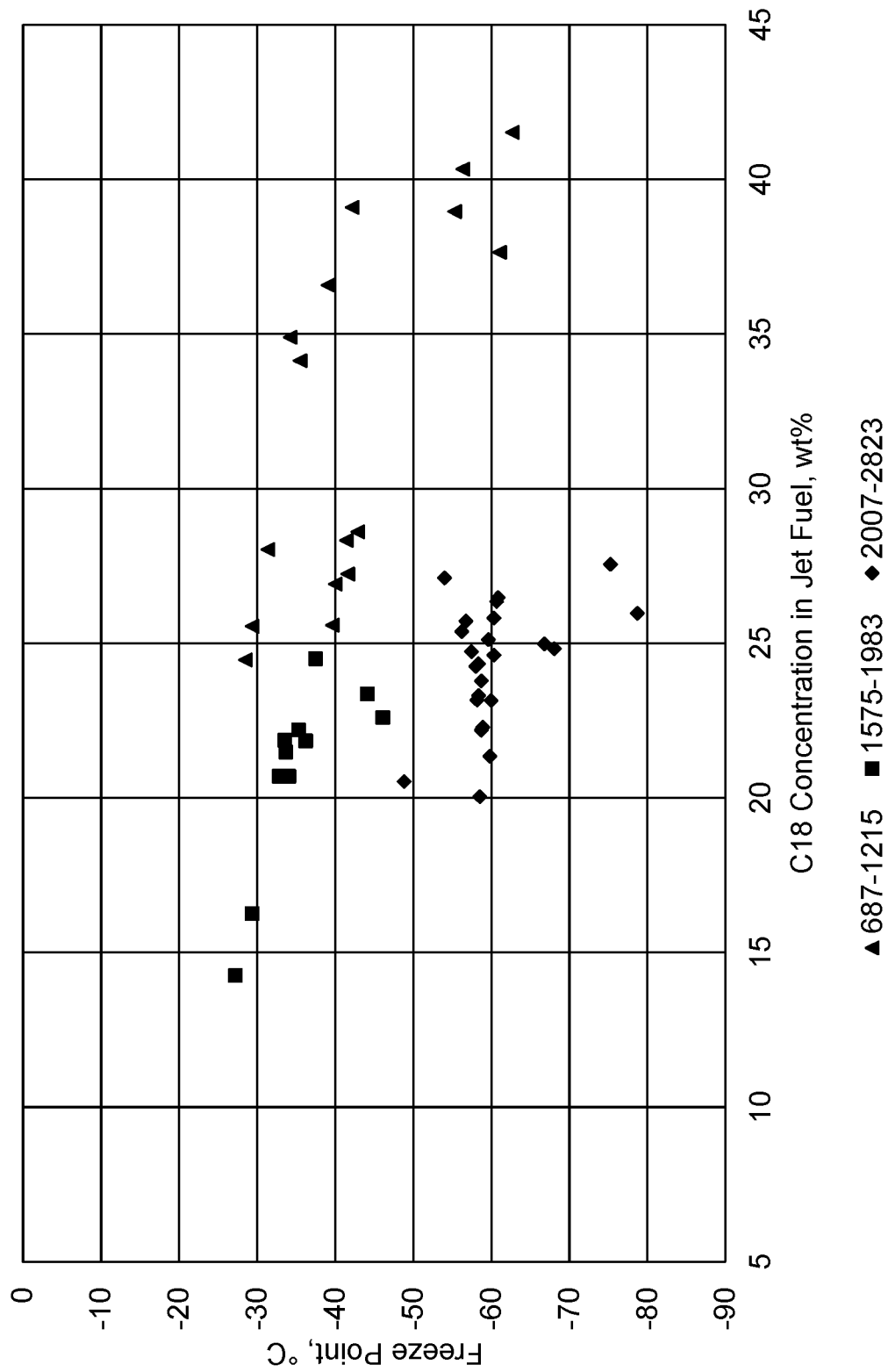
FIG. 4 is a plot of freeze point of the jet fuel vs. C18 paraffin concentration.

FIG. 4 is a plot of freeze point of the jet fuel vs. C18 paraffin concentration. Several samples had freeze points not higher than −40° C. and some not higher than −47° C. At higher concentrations of C18, such as more than 35 or 40 wt %, freeze points were not higher than −50° C. or −60° C., respectively. The triangles indicate that some of the isomerized diesel stream was recycled to selective hydrocracking; whereas, other data points indicate a run which involved only isomerization.

Figure 5:
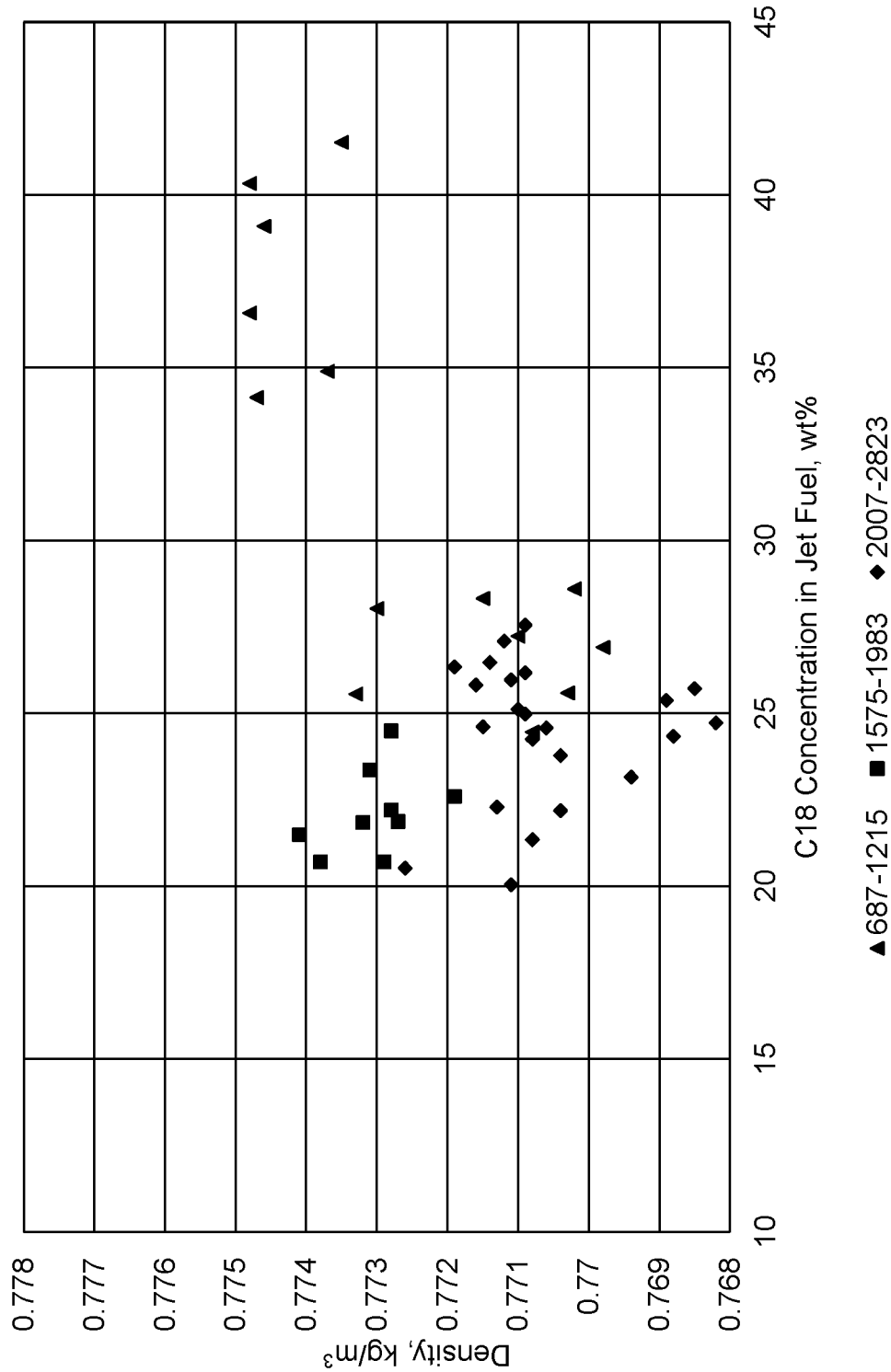
FIG. 5 is a plot of density of the jet fuel vs. C18 paraffin concentration.

FIG. 5 is a plot of density of the jet fuel vs. C18 paraffin concentration. Several samples had densities below 0.772 kg/m$^3$ and many were below 0.770 kg/m$^3$. Most samples were below 0.774 kg/m$^3$.

Figure 6:
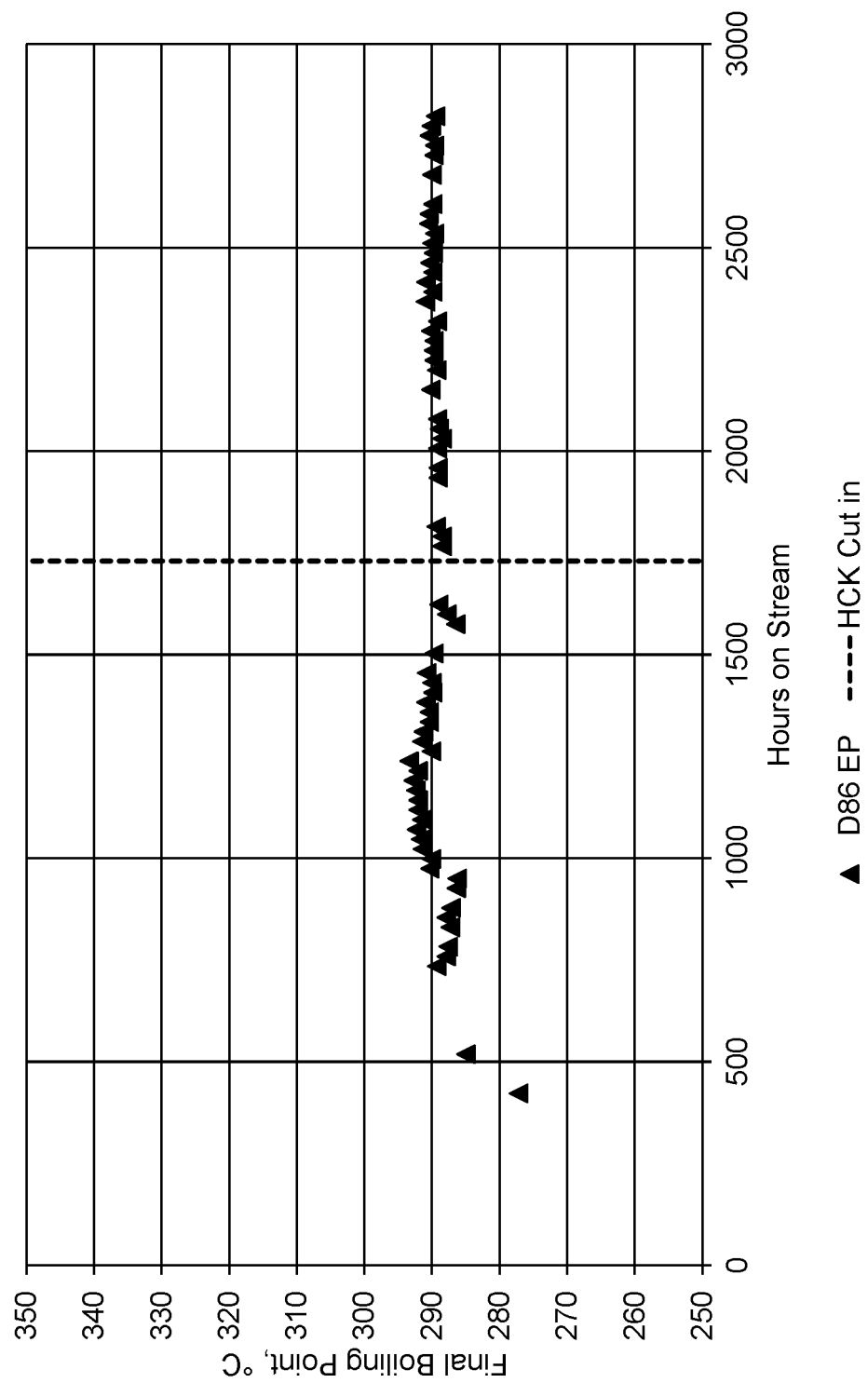
FIG. 6 is a plot of the FBP of the jet fuel vs. hours on stream.

FIG. 6 is a plot depicting the FBP of the jet fuel stream depicted in FIGS. 4 and 5 over all of the time on stream based on ASTM D86. All of the samples had FBP below 300° C.

Example 3

We analyzed the degree of branching of the C18 paraffin molecules produced in Example 2. The C18 paraffin molecules were highly branched. We found that about 4 to about 25 wt % of the C18 paraffin molecules in the jet fuel stream were monomethyl substituted and about 15 to about 20 wt % of the monomethyl C18 paraffin molecules were most common in the jet fuel stream. We found that about 7 to about 33 wt % of the C18 paraffin molecules in the jet fuel stream were dimethyl substituted and about 20 to about 30 wt % of the dimethyl C18 paraffin molecules were most common in the jet fuel stream. We found that about 8 to about 25 wt % of the C18 paraffin molecules in the jet fuel stream were polymethyl substituted and about 15 to about 23 wt % of the polymethyl C18 paraffin molecules were most common in the jet fuel stream.

The disclosed process and catalyst can provide jet fuel that meets the jet fuel specifications for ASTM D7566.

SPECIFIC EMBODIMENTS

While the following is described in conjunction with specific embodiments, it will be understood that this description is intended to illustrate and not limit the scope of the preceding description and the appended claims.

A first embodiment of the invention is a composition of fuel comprising at least 14 wt % hydrocarbon molecules having at least 18 carbon atoms and a freeze point not higher than −40° C. An embodiment of the invention is one, any or all of prior embodiments in this paragraph up through the first embodiment in this paragraph further comprising a freeze point not higher than −47° C. An embodiment of the invention is one, any or all of prior embodiments in this paragraph up through the first embodiment in this paragraph further exhibiting a final boiling point of no more than 300° C. An embodiment of the invention is one, any or all of prior embodiments in this paragraph up through the first embodiment in this paragraph further comprising a density of no less than 768 kg/m$^3$. An embodiment of the invention is one, any or all of prior embodiments in this paragraph up through the first embodiment in this paragraph further comprising at least 8 wt % of C18 paraffins are polymethyl substituted. An embodiment of the invention is one, any or all of prior embodiments in this paragraph up through the first embodiment in this paragraph further comprising at least 20 wt % hydrocarbon molecules have at least 18 carbon atoms. An embodiment of the invention is one, any or all of prior embodiments in this paragraph up through the first embodiment in this paragraph further comprising a cloud point of no more than −20° C.

A second embodiment of the invention is a process for hydroprocessing a biorenewable feed stream comprising hydrotreating the biorenewable feed stream in the presence of hydrogen over a hydrotreating catalyst to hydrodeoxygenate the biorenewable feed stream to provide a hydrotreated stream; hydroisomerizing a hydroisomerization feed stream taken from the hydrotreated stream in the presence of hydrogen over a hydroisomerization catalyst to provide a hydroisomerized stream, the hydroisomerization catalyst comprising a metal component, a molecular sieve and a metal oxide binder, wherein about 40 to about 65 wt % of the metal component is dispersed on the molecular sieve and about 40 to about 65 wt % of the metal component is dispersed on the metal oxide binder; and distilling the hydroisomerized stream, optionally after separation and stripping, to produce a jet fuel stream and a diesel stream. An embodiment of the invention is one, any or all of prior embodiments in this paragraph up through the second embodiment in this paragraph further comprising hydrocracking a hydrocracking stream taken from the diesel stream to provide a hydrocracked stream comprising jet fuel. An embodiment of the invention is one, any or all of prior embodiments in this paragraph up through the second embodiment in this paragraph further comprising distilling the hydrocracked stream with the hydroisomerized stream.

An embodiment of the invention is one, any or all of prior embodiments in this paragraph up through the second embodiment in this paragraph further comprising hydroisomerizing the hydrocracked stream. An embodiment of the invention is one, any or all of prior embodiments in this paragraph up through the second embodiment in this paragraph further comprising hydroisomerizing the hydrocracked stream with the hydroisomerization feed stream. An embodiment of the invention is one, any or all of prior embodiments in this paragraph up through the second embodiment in this paragraph further comprising hydroisomerizing a hydroisomerization recycle stream taken from the diesel stream. An embodiment of the invention is one, any or all of prior embodiments in this paragraph up through the second embodiment in this paragraph further comprising hydroisomerizing the hydroisomerization recycle steam with the hydroisomerization feed stream.

A third embodiment of the invention is a process for hydroprocessing a hydroisomerization feed stream comprising hydroisomerizing the hydroisomerization feed stream in the presence of hydrogen over a hydroisomerization catalyst to provide a hydroisomerized stream, the hydroisomerization catalyst comprising a metal component, a molecular sieve and a metal oxide binder, wherein about 40 to about 65 wt % of the metal component is dispersed on the molecular sieve and about 40 to about 65 wt % of the metal component is dispersed on the metal oxide binder; and separating the hydroisomerized stream into a liquid hydroisomerized stream and the liquid hydroisomerized stream comprises at least 14 wt % hydrocarbon molecules having at least 18 carbon atoms and a freeze point not higher than −40° C. An embodiment of the invention is one, any or all of prior embodiments in this paragraph up through the third embodiment in this paragraph wherein a final boiling point of the liquid hydroisomerized stream is no more than 300° C. An embodiment of the invention is one, any or all of prior embodiments in this paragraph up through the third embodiment in this paragraph wherein the density of the hydroisomerized stream is no more than 772 kg/m³. An embodiment of the invention is one, any or all of prior embodiments in this paragraph up through the third embodiment in this paragraph further comprising hydrotreating a biorenewable feed stream in the presence of hydrogen over a hydrotreating catalyst to hydrodeoxygenate the biorenewable feed stream to provide a hydrotreated stream and taking the hydroisomerization feed stream from the hydrotreated stream. An embodiment of the invention is one, any or all of prior embodiments in this paragraph up through the third embodiment in this paragraph distilling the liquid hydroisomerized stream to provide a jet stream and a diesel stream. An embodiment of the invention is one, any or all of prior embodiments in this paragraph up through the third embodiment in this paragraph further comprising taking a recycle stream from the diesel stream and hydrocracking the recycle stream or hydroisomerizing the recycle stream.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for hydroprocessing a biorenewable feed stream comprising:
   hydrotreating said biorenewable feed stream in the presence of hydrogen over a hydrotreating catalyst to hydrodeoxygenate said biorenewable feed stream to provide a hydrotreated stream;
   hydroisomerizing a hydroisomerization feed stream taken from said hydrotreated stream in the presence of hydrogen over a hydroisomerization catalyst to provide a hydroisomerized stream, said hydroisomerization catalyst comprising a metal component, a molecular sieve and a metal oxide binder, wherein about 40 to about 65 wt % of said metal component is dispersed on said molecular sieve and about 40 to about 65 wt % of said metal component is dispersed on said metal oxide binder; and
   distilling said hydroisomerized stream, optionally after separation and stripping, to produce a jet fuel stream and a diesel stream.

2. The process of claim 1 further comprising hydrocracking a hydrocracking stream taken from said diesel stream to provide a hydrocracked stream comprising jet fuel.

3. The process of claim 2 further comprising distilling said hydrocracked stream with said hydroisomerized stream.

4. The process of claim 1 further comprising hydroisomerizing said hydrocracked stream.

5. The process of claim 4 further comprising hydroisomerizing said hydrocracked stream with said hydroisomerization feed stream.

6. The process of claim 1 further comprising hydroisomerizing a hydroisomerization recycle stream taken from said diesel stream.

7. The process of claim 6 further comprising hydroisomerizing said hydroisomerization recycle steam with said hydroisomerization feed stream.

8. A process for hydroprocessing a hydroisomerization feed stream comprising:
   hydroisomerizing said hydroisomerization feed stream in the presence of hydrogen over a hydroisomerization catalyst to provide a hydroisomerized stream, said hydroisomerization catalyst comprising a metal component, a molecular sieve and a metal oxide binder wherein about 40 to about 65 wt % of said metal component is dispersed on said molecular sieve and about 40 to about 65 wt % of said metal component is dispersed on said metal oxide binder;
   separating the hydroisomerized stream into a liquid hydroisomerized stream; and
   distilling said liquid hydroisomerized stream to provide a jet fuel stream and a diesel stream, wherein the jet fuel stream comprises at least 14 wt % hydrocarbon molecules having at least 18 carbon atoms and a freeze point not higher than −40° C.

9. The process of claim 8 wherein a final boiling point of the jet fuel stream is no more than 300° C.

10. The process of claim 9 wherein the density of the jet fuel stream is no more than 772 kg/m3.

11. The process of claim 8 further comprising hydrotreating a biorenewable feed stream in the presence of hydrogen over a hydrotreating catalyst to hydrodeoxygenate said biorenewable feed stream to provide a hydrotreated stream and taking said hydroisomerization feed stream from said hydrotreated stream.

12. The process of claim 8 further comprising taking a recycle stream from said diesel stream and hydrocracking said recycle stream or hydroisomerizing said recycle stream.

\* \* \* \* \*